[19] United States Patent
Monassebian

(10) Patent No.: US 8,788,393 B2
(45) Date of Patent: Jul. 22, 2014

(54) SYSTEM AND METHOD FOR REBALANCING PORTFOLIOS

(71) Applicant: Bijan Monassebian, Great Neck, NY (US)

(72) Inventor: Bijan Monassebian, Great Neck, NY (US)

(73) Assignee: Ordex Systems, Inc., Great Neck, NY (US)

(*) Notice: Subject to any disclaimer, the term of this patent is extended or adjusted under 35 U.S.C. 154(b) by 0 days.

(21) Appl. No.: 13/676,713

(22) Filed: Nov. 14, 2012

(65) Prior Publication Data

US 2013/0138579 A1    May 30, 2013

Related U.S. Application Data

(60) Provisional application No. 61/559,336, filed on Nov. 14, 2011.

(51) Int. Cl.
*G06Q 40/00* (2012.01)
*G06Q 40/04* (2012.01)
*G06Q 40/06* (2012.01)

(52) U.S. Cl.
CPC ............... *G06Q 40/06* (2013.01); *G06Q 40/04* (2013.01)

USPC .................... 705/36 R; 705/35; 705/37

(58) Field of Classification Search
CPC ............... G06Q 40/06; G06Q 40/04
USPC ............................ 705/36 R, 37, 35
See application file for complete search history.

(56) References Cited

U.S. PATENT DOCUMENTS

| 7,680,719 B1* | 3/2010 | Brady et al. ............... 705/36 R |
| 7,689,493 B1* | 3/2010 | Sullivan et al. ........... 705/36 R |
| 7,979,334 B2* | 7/2011 | Kochansky ................ 705/36 R |
| 2007/0239586 A1* | 10/2007 | Inala et al. ................ 705/36 R |

* cited by examiner

*Primary Examiner* — Jagdish Patel
(74) *Attorney, Agent, or Firm* — Brian J. Colandreo; Michael T. Abramson; Holland & Knight, LLP

(57) ABSTRACT

A method, computer program product, and computer system for identifying, by a computing device, one or more portfolio assets in a portfolio. One or more asset characteristics are associated with at least a portion of the one or more portfolio assets. A group that includes at least the portion of the one or more portfolio assets and one or more corresponding model components is generated based upon, at least in part, the one or more asset characteristics. The group is rebalanced based upon, at least in part, one or more values of at least the portion of the one or more portfolio assets and one or more values of the one or more corresponding model components.

21 Claims, 18 Drawing Sheets

FINANCIAL ASSETS

FINANCIAL PORTFOLIOS

| | 4-10 | 4-20 | 4-30 | | 4-40 | 4-50 | 4-60 | 4-70 |
|---|---|---|---|---|---|---|---|---|
| Line Symbol | Price | Quantity | Position Value | Acct % | Acct. Inv. Objective | Asset Type | Asset Name | Fund Family |
| 1 AMECX | 18.09 | 1,026.44 | 18,568 | 13.3535% | BALANCED - HYBRID | BLEND | AMERICAN FUNDS INC FND OF AMR A | AMERICAN FUNDS |
| 2 CAIBX | 53.00 | 160.11 | 8,486 | 6.057% | BALANCED - HYBRID | BLEND | AMERICAN FUNDS CAP INC BLD DR A | AMERICAN FUNDS |
| 3 AFAXX | 1.00 | 14,000.00 | 14,000 | 9.993% | CASH OR EQUIVALENTS | CASH OR EQUIVALENT | AMERICAN FUNDS MONEY MARKET FUN | AMERICAN FUNDS |
| 4 MONEYFUND | 1.00 | 400.17 | 400 | 0.286% | CASH OR EQUIVALENTS | CASH OR EQUIVALENT | BROKERAGE MONEY MARKET | BROKERAGE MONEY MA |
| 5 AKAS | 3.68 | 188.00 | 208 | 0.148% | COMMON STOCK | EQUITY | ABRAXAS PETE CORP COM | Not Assigned |
| 6 BAC | 9.74 | 85.00 | 828 | 0.591% | COMMON STOCK | EQUITY | BANK OF AMERICA CORPORATION COM | Not Assigned |
| 7 DIGA | 0.07 | 12.00 | 1 | | COMMON STOCK | EQUITY | DIGITAL ANGEL CORP NEW COM NEW | Not Assigned |
| 8 ANWPX | 30.45 | 374.40 | 11,400 | 8.197% | INTERNATIONAL EQUITY | EQUITY | AMERICAN FUNDS NEW PERSPECTIVE A | AMERICAN FUNDS |
| 9 AGTHX | 33.81 | 536.11 | 18,126 | 12.938% | LARGE CAP - GROWTH | EQUITY | AMERICAN FUNDS GR FND OF AMER A | AMERICAN FUNDS |
| 10 OAROX | 17.36 | 446.18 | 7,746 | 5.529% | LARGE CAP - GROWTH | EQUITY | OPPENHEIMER RISING DIVIDENDS FUND | OPPENHEIMER FUNDS |
| 11 00770B392 | 10.76 | 946.45 | 10,184 | 7.269% | LARGE CAP - VALUE | EQUITY | ADVISORS DISCIPLINED TR UTS IHGSR | Not Assigned |
| 12 AIVSX | 30.70 | 814.72 | 25,011 | 17.855% | LARGE CAP - VALUE | EQUITY | AMERICAN FUNDS INV CO OF AMER A | AMERICAN FUNDS |
| 13 ANCFX | 40.30 | 453.05 | 18,258 | 13.032% | LARGE CAP - VALUE | EQUITY | AMERICAN FUNDS FUNDAMENTL INVS A | AMERICAN FUNDS |
| 14 JPM.PRS | 25.50 | 270.00 | 6,885 | 4.914% | PREFERRED STOCK | EQUITY | JPMORGAN CHASE CAP XIX 6.625%CAP | Not Assigned |

FIG. 6

ASSET BASED MODEL AND COMPONENTS

| Line | Asset Symbol | Asset Description | Asset Type | Sec. Type | Investment Objective | % of Total | Upper % | Lower % | Lot Size | Last Price | Cum % Weight |
|---|---|---|---|---|---|---|---|---|---|---|---|
| 1 | AHITX | AMERICAN FUNDS HIGH INCOME TT FIXED INCOME | FIXED INCOME | mf | CORPORATE - HIGH YIELD | 10.00 | 5.00 | 5.00 | 100 | 11.25 | 10.00 |
| 2 | ABNDX | BOND FUND OF AMERICA FUND CL FIXED INCOME | FIXED INCOME | mf | CORPORATE - INVESTMENT GRADE | 10.00 | 5.00 | 5.00 | 100 | 12.96 | 20.00 |
| 3 | CWGIX | AMERICAN FUNDS CAP WLD GRWTH EQUITY | EQUITY | mf | INTERNATIONAL EQUITY | 7.50 | 5.00 | 5.00 | 100 | 36.41 | 27.50 |
| 4 | NEWFX | AMERICAN FUNDS NEW WORLD A EQUITY | EQUITY | mf | INTERNATIONAL EQUITY | 7.50 | 5.00 | 5.00 | 100 | 52.91 | 35.00 |
| 5 | AGTHX | AMERICAN FUNDS GR FND OF AMER EQUITY | EQUITY | mf | LARGE CAP - GROWTH | 30.00 | 5.00 | 5.00 | 100 | 33.81 | 65.00 |
| 6 | AIVSX | AMERICAN FUNDS INV CO OF AMER EQUITY | EQUITY | mf | LARGE CAP - VALUE | 15.00 | 5.00 | 5.00 | 100 | 28.70 | 80.00 |
| 7 | ANCFX | AMERICAN FUNDS FUNDAMENTL IN EQUITY | EQUITY | mf | LARGE CAP - VALUE | 20.00 | 5.00 | 5.00 | 100 | 40.30 | 100.00 |

FIG. 7

SYNTHETIC ASSET BASED MODEL AND COMPONENTS

| Line | Asset Symbol | Asset Description | Asset Type | Sec. Type | Investment Objective | % of Total | Upper % | Lower % | Cum % Weight |
|---|---|---|---|---|---|---|---|---|---|
| 1 | Synthetic2012-10 | Synthetic | Synthetic | Synthetic | BALANCED - HYBRID | 20.00 | 2.00 | 2.00 | 20.00 |
| 2 | Synthetic2012-10 | Synthetic | Synthetic | Synthetic | CORPORATE - HIGH YIELD | 15.00 | 2.00 | 2.00 | 35.00 |
| 3 | Synthetic2012-10 | Synthetic | Synthetic | Synthetic | INTERNATIONAL EQUITY | 5.00 | 5.00 | 5.00 | 40.00 |
| 4 | Synthetic2012-10 | Synthetic | Synthetic | Synthetic | LARGE CAP - GROWTH | 12.50 | 5.00 | 5.00 | 52.50 |
| 5 | Synthetic2012-10 | Synthetic | Synthetic | Synthetic | LARGE CAP - VALUE | 12.50 | 5.00 | 5.00 | 65.00 |
| 6 | Synthetic2012-10 | Synthetic | Synthetic | Synthetic | MUNICIPAL BOND - HIGH QUALITY | 15.00 | 2.00 | 2.00 | 80.00 |
| 7 | Synthetic2012-10 | Synthetic | Synthetic | Synthetic | MUNICIPAL BOND - HIGH YIELD | 20.00 | 2.00 | 2.00 | 100.00 |

PORTFOLIO AND CORRESPONDING MODEL VALUES

| Line | Symbol | Price | Quantity | Position value | Acct % | Acct. Inv. Objective | Model % | Model Inv. Objective | Asset Type | Asset Name |
|---|---|---|---|---|---|---|---|---|---|---|
| 1 | BALFX | 20.29 | 1,467.04 | 29,766 | 4.692% | BALANCED - HYBRID | 10.000% | BALANCED - HYBRID | BLEND | AMERICAN FUNDS AMER BALANCED FD F |
| 2 | FKINX | 2.22 | 27,678.53 | 61,446 | 9.688% | BALANCED - HYBRID | | | BLEND | FRANKLIN INCOME FUND - CLASS A |
| 3 | FKIAX | 2.21 | 22,776.92 | 50,337 | 7.936% | BALANCED - HYBRID | | | BLEND | FRANKLIN INCOME FUND - ADVISOR CL |
| 4 | IFAFX | 18.06 | 962.71 | 17,387 | 2.741% | BALANCED - HYBRID | | | BLEND | AMERICAN FUNDS INC FND OF AMER F |
| 5 | MONEYFUND | 1.00 | 28,260.97 | 28,261 | 4.456% | CASH OR EQUIVALENTS | | | CASH OR EQUIVALENT | BROKERAGE MONEY MARKET |
| 6 | AHITX | 11.25 | 3,722.77 | 41,881 | 6.603% | CORPORATE - HIGH YIELD | 10.000% | CORPORATE - HIGH YIELD | FIXED INCOME | AMERICAN HIGH-INCOME TRUST-F |
| 7 | CWGIX | 36.41 | 1,573.06 | 57,284 | 9.042% | INTERNATIONAL EQUITY | 10.000% | INTERNATIONAL EQUITY | EQUITY | AMERICAN FUNDS CAP WLD GR&INC A |
| 8 | GFAFX | 33.61 | 1,902.22 | 63,933 | 10.085% | LARGE CAP - GROWTH | 30.000% | LARGE CAP - GROWTH | EQUITY | AMERICAN FUNDS GR FND OF AMER F |
| 9 | 00177XBA28 | 10.76 | 6,990.49 | 75,218 | 11.865% | LARGE CAP - VALUE | 35.000% | LARGE CAP - VALUE | EQUITY | ADVISORS DISCIPLINED TR UTF75 UHC501 |
| 10 | AFFFX | 40.28 | 772.26 | 31,106 | 4.906% | LARGE CAP - VALUE | | | EQUITY | AMERICAN FUNDS FUNDAMENTAL INVES |
| 11 | AICFX | 33.65 | 1,609.27 | 55,454 | 8.745% | LARGE CAP - VALUE | | | EQUITY | AMERICAN FUNDS INV CO OF AMER F |
| 12 | ANCFX | 40.30 | 678.46 | 27,343 | 4.311% | LARGE CAP - VALUE | | | EQUITY | AMERICAN FUNDS FUNDAMENTL INVS A |
| 13 | Synthetic | | | | | | 10.000% | MUNICIPAL BOND - HIGH QUALITY | Synthetic | Synthetic |
| 14 | FRHIX | 10.95 | 8,654.58 | 94,768 | 14.942% | MUNICIPAL BOND - HIGH YIELD | 15.000% | MUNICIPAL BOND - HIGH YIELD | FIXED INCOME | FRANKLIN HIGH YLD TF INC FUND - CLA |

ASSET ALLOCATION POLICIES AND COMPONENTS OF SELECTED POLICY

| | | Details of Selected Asset Allocation Policy | | | |
|---|---|---|---|---|---|
| Line | Policy Name (Click to Update) | Categories | Portfolios Assigned | Models Assigned | Policy Type | Creation Date/Time |
| 1 | BALANCED ALLOCATION POLICY | 4 | 2 | 0 | Assigned | Thu Feb 23 16:48:55 EST 2012 |
| 2 | GROWTH INCOME ALLOCATION POLICY | 4 | 1 | 0 | Assigned | Thu Feb 23 16:54:46 EST 2012 |

| Line | Asset Allocation Policy Name | Asset Type | Lo Alloc % | Hi Alloc % |
|---|---|---|---|---|
| 1 | GROWTH INCOME ALLOCATION POLICY | BLEND | 35.00 | 55.00 |
| 2 | GROWTH INCOME ALLOCATION POLICY | CASH OR EQUIVALENTS | 0.00 | 15.00 |
| 3 | GROWTH INCOME ALLOCATION POLICY | EQUITY | 25.00 | 45.00 |
| 4 | GROWTH INCOME ALLOCATION POLICY | FIXED INCOME | 10.00 | 30.00 |

| | | | | | | |
|---|---|---|---|---|---|---|
| 3 | GROWTH INCOME BLEND MODERATE | 4 | 0 | 0 | Assigned | Mon Jan 02 15:46:06 EST 2012 |
| 4 | MODERATE GROWTH ALLOCATION POLICY | 4 | 1 | 0 | Assigned | Tue May 01 13:51:11 EDT 2012 |

Callouts: 9-10, 9-20, 9-30, 9-40, 9-50

FIG. 11

SYSTEM AND METHOD FOR REBALANCING PORTFOLIOS

RELATED CASES

This application claims the benefit of U.S. Provisional Application No. 61/559,336, filed on 14 Nov. 2011, by Bijan Monassebian, entitled System and Method to Rebalance Single or Multiple Financial Portfolios Automatically By User Selected Criteria, the contents of which are all incorporated by reference.

BACKGROUND

Asset allocation, e.g., for a financial portfolio, may determine the portfolio's risk and return characteristics. For example, asset allocation may generally be described as the process of determining what financial instruments (e.g., assets) may be incorporated into the portfolio to maximize the portfolio's return within risk tolerance levels determined by, e.g., the owner of the portfolio. As different asset classes may produce different returns, over time, the portfolio's asset values (and thereby the asset allocation) may change. To recapture the portfolio's original risk and return characteristics, the portfolio may be "rebalanced" to its original asset allocation criteria determined by the owner of the portfolio.

Many factors may influence a rebalancing strategy which may be a function of, e.g., portfolio assets' expected returns, volatility, and the correlation of their returns. Typically, to perform the rebalancing process, an approach may be used to compare the portfolio's current percent value of each asset relative to the total portfolio value, to the original asset allocation criteria which may generally define the desired percent value of each asset relative to the total portfolio value. Such an approach primarily may be based upon the asset symbol or Committee on Uniform Security Identification Procedures (CUSIP).

BRIEF SUMMARY OF DISCLOSURE

In one implementation, a method, performed by one or more computing devices, comprises identifying, by a computing device, one or more portfolio assets in a portfolio. One or more asset characteristics are associated with at least a portion of the one or more portfolio assets. A group that includes at least the portion of the one or more portfolio assets and one or more corresponding model components is generated based upon, at least in part, the one or more asset characteristics. The group is rebalanced based upon, at least in part, one or more values of at least the portion of the one or more portfolio assets and one or more values of the one or more corresponding model components.

One or more of the following features may be included. At least one of the one or more asset characteristics may include at least one of an asset type, an industry segment, an asset group, an asset risk investment objective, and a customized asset characteristic. Rebalancing may include aggregating the one or more values of at least the portion of the one or more portfolio assets and the one or more values of one or more corresponding model components, comparing the one or more values of at least the portion of the one or more portfolio assets with the one or more values of the one or more corresponding model components, and determining that a threshold is reached between the one or more values of at least the portion of the one or more portfolio assets and the one or more values of the one or more corresponding model components. Rebalancing may further include generating at least one of a buy order and a sell order associated with the group based upon, at least in part, determining that the threshold is reached. Rebalancing may further include determining whether a first asset is present in at least the portion of the one or more portfolio assets and the one or more corresponding model components, and if the first asset is absent in at least the portion of the one or more portfolio assets and present in the one or more corresponding model components, generating a buy order associated with the first asset, and if the first asset is present in at least the portion of the one or more portfolio assets and absent in the one or more corresponding model components, generating a sell order associated with the first asset. A compliance guideline associated with the portfolio may be defined based upon, at least in part, the one or more asset characteristics. It may be determined that the portfolio is non-compliant with the compliance guideline, and an alert may be provided based upon, at least in part, determining that the portfolio is non-compliant with the compliance guideline.

In another implementation, a computing system includes a processor and a memory configured to perform operations comprising identifying, by a computing device, one or more portfolio assets in a portfolio. One or more asset characteristics are associated with at least a portion of the one or more portfolio assets. A group that includes at least the portion of the one or more portfolio assets and one or more corresponding model components is generated based upon, at least in part, the one or more asset characteristics. The group is rebalanced based upon, at least in part, one or more values of at least the portion of the one or more portfolio assets and one or more values of the one or more corresponding model components.

One or more of the following features may be included. At least one of the one or more asset characteristics may include at least one of an asset type, an industry segment, an asset group, an asset risk investment objective, and a customized asset characteristic. Rebalancing may include aggregating the one or more values of at least the portion of the one or more portfolio assets and the one or more values of one or more corresponding model components, comparing the one or more values of at least the portion of the one or more portfolio assets with the one or more values of the one or more corresponding model components, and determining that a threshold is reached between the one or more values of at least the portion of the one or more portfolio assets and the one or more values of the one or more corresponding model components. Rebalancing may further include generating at least one of a buy order and a sell order associated with the group based upon, at least in part, determining that the threshold is reached. Rebalancing may further include determining whether a first asset is present in at least the portion of the one or more portfolio assets and the one or more corresponding model components, and if the first asset is absent in at least the portion of the one or more portfolio assets and present in the one or more corresponding model components, generating a buy order associated with the first asset, and if the first asset is present in at least the portion of the one or more portfolio assets and absent in the one or more corresponding model components, generating a sell order associated with the first asset. A compliance guideline associated with the portfolio may be defined based upon, at least in part, the one or more asset characteristics. It may be determined that the portfolio is non-compliant with the compliance guideline, and an alert may be provided based upon, at least in part, determining that the portfolio is non-compliant with the compliance guideline.

In another implementation, a computer program product resides on a computer readable storage medium that has a plurality of instructions stored on it. When executed by a processor, the instructions cause the processor to perform operations comprising identifying, by a computing device, one or more portfolio assets in a portfolio. One or more asset characteristics are associated with at least a portion of the one or more portfolio assets. A group that includes at least the portion of the one or more portfolio assets and one or more corresponding model components is generated based upon, at least in part, the one or more asset characteristics. The group is rebalanced based upon, at least in part, one or more values of at least the portion of the one or more portfolio assets and one or more values of the one or more corresponding model components.

One or more of the following features may be included. At least one of the one or more asset characteristics may include at least one of an asset type, an industry segment, an asset group, an asset risk investment objective, and a customized asset characteristic. Rebalancing may include aggregating the one or more values of at least the portion of the one or more portfolio assets and the one or more values of one or more corresponding model components, comparing the one or more values of at least the portion of the one or more portfolio assets with the one or more values of the one or more corresponding model components, and determining that a threshold is reached between the one or more values of at least the portion of the one or more portfolio assets and the one or more values of the one or more corresponding model components. Rebalancing may further include generating at least one of a buy order and a sell order associated with the group based upon, at least in part, determining that the threshold is reached. Rebalancing may further include determining whether a first asset is present in at least the portion of the one or more portfolio assets and the one or more corresponding model components, and if the first asset is absent in at least the portion of the one or more portfolio assets and present in the one or more corresponding model components, generating a buy order associated with the first asset, and if the first asset is present in at least the portion of the one or more portfolio assets and absent in the one or more corresponding model components, generating a sell order associated with the first asset. A compliance guideline associated with the portfolio may be defined based upon, at least in part, the one or more asset characteristics. It may be determined that the portfolio is non-compliant with the compliance guideline, and an alert may be provided based upon, at least in part, determining that the portfolio is non-compliant with the compliance guideline.

The details of one or more implementations are set forth in the accompanying drawings and the description below. Other features and advantages will become apparent from the description, the drawings, and the claims.

BRIEF DESCRIPTION OF THE DRAWINGS

Figure 4:
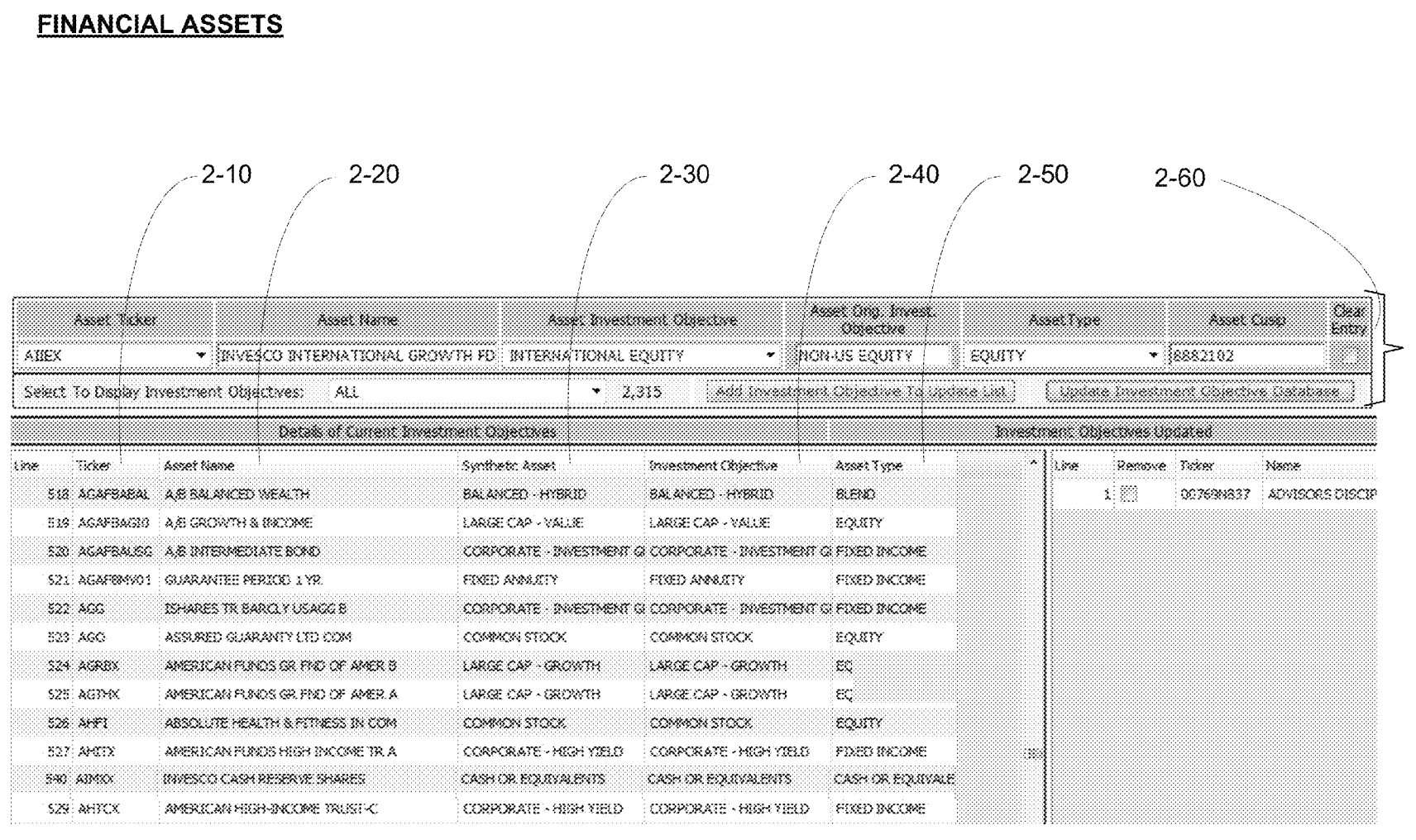

FIG. 4 is an illustrative diagrammatic view of a screen image displayed by the rebalance process of FIG. 1 according to one or more implementations of the present disclosure;

Figure 5:
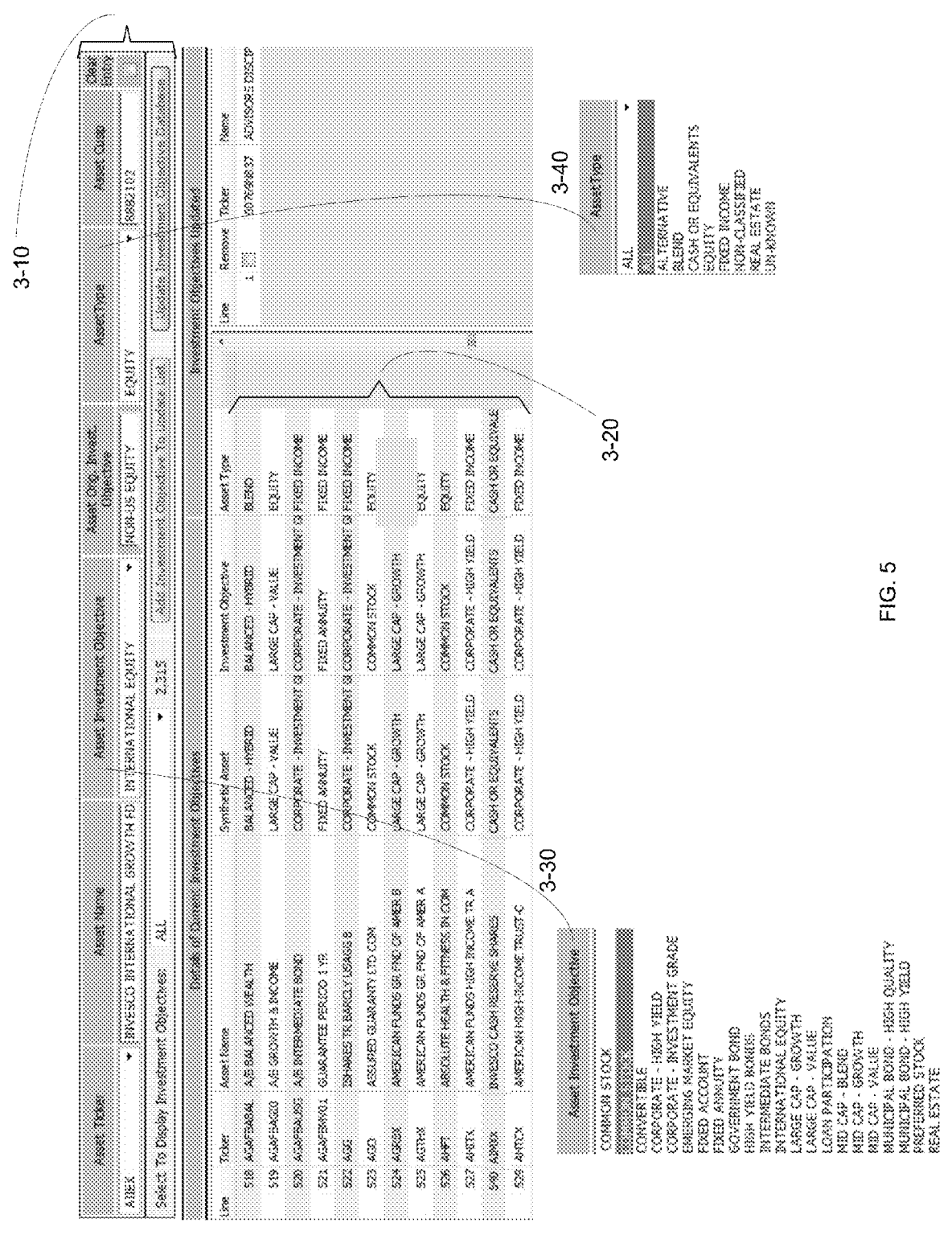

FIG. 5 is an illustrative diagrammatic view of a screen image displayed by the rebalance process of FIG. 1 according to one or more implementations of the present disclosure;

FIG. 6 is an illustrative diagrammatic view of a screen image displayed by the rebalance process of FIG. 1 according to one or more implementations of the present disclosure;

FIG. 7 is an illustrative diagrammatic view of a screen image displayed by the rebalance process of FIG. 1 according to one or more implementations of the present disclosure;

FIG. 8 is an illustrative diagrammatic view of a screen image displayed by the rebalance process of FIG. 1 according to one or more implementations of the present disclosure;

FIG. 9 is an illustrative diagrammatic view of a screen image displayed by the rebalance process of FIG. 1 according to one or more implementations of the present disclosure;

FIG. 11 is an illustrative diagrammatic view of a screen image displayed by the rebalance process of FIG. 1 according to one or more implementations of the present disclosure.

Like reference symbols in the various drawings indicate like elements.

DETAILED DESCRIPTION

Figure 1:
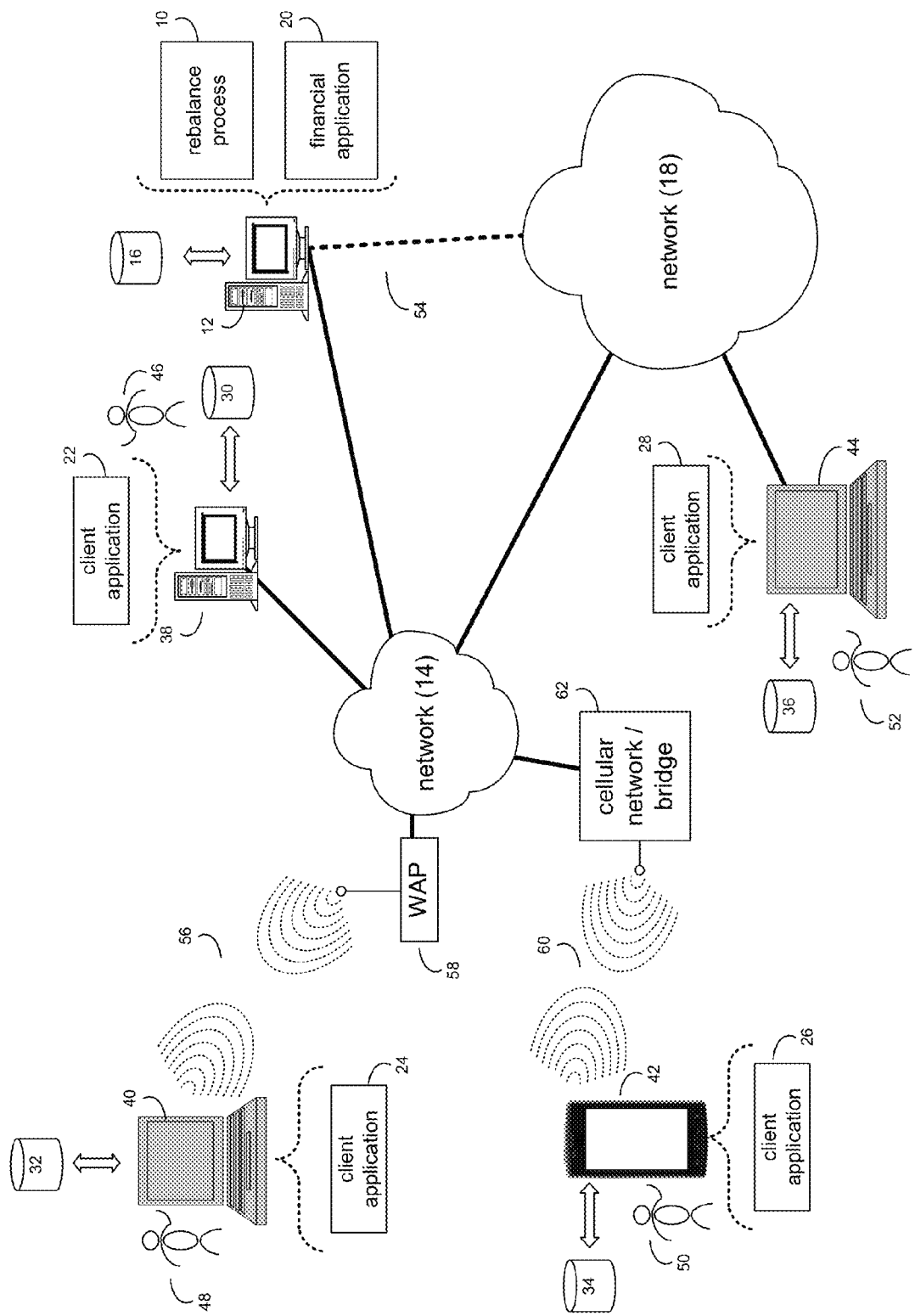
FIG. 1 is an illustrative diagrammatic view of a rebalance process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown rebalance process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, rebalance process 10 may identify, by a computing device, one or more portfolio assets in a portfolio. One or more asset characteristics may be associated with at least a portion of the one or more portfolio assets. A group that includes at least the portion of the one or more portfolio assets and one or more corresponding model components may be generated based upon, at least in part, the one or more asset characteristics. The group may be rebalanced based upon, at least in part, one or more values of at least the portion of the one or more portfolio assets and one or more values of the one or more corresponding model components.

The instruction sets and subroutines of rebalance process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. Any data described throughout may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Rebalance process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a financial application (e.g., financial application 20), examples of which may include, but are not limited to, e.g., a financial planning application, a financial management application, a financial instrument trading application, financial modeling application, accounting application, investor data provider (e.g., investor information, holdings information, household information, etc.) application, market data and asset data service application, compliance guidelines (e.g., asset allocation policies, other compliance data, etc.) application, compliance management application, financial markets (e.g., exchanges, ECN's, ATS's, market makers, etc.) applications, or other application that allows for financial modeling, management, message and transaction switching, and/or transactions, such as Ordex®. In some implementations, investor and holdings information may include investor data, e.g., details of holdings such as assets, values of those assets, standard asset symbol (ticker), etc.

Rebalance process 10 and/or financial application 20 may be accessed via client applications 22, 24, 26, 28. Rebalance process 10 may be a stand alone application, or may be an applet/application/script that may interact with and/or be executed within financial application 20. Examples of client applications 22, 24, 26, 28 may include, but are not limited to, e.g., a financial planning application, a financial management application, a financial instrument trading application, financial modeling application, accounting application, investor data provider (e.g., investor information, holdings information, household information, etc.) application, market data and asset data service application, compliance guidelines (e.g., asset allocation policies, other compliance data, etc.) application, compliance management application, financial markets (e.g., exchanges, ECN's, ATS's, market makers, etc.) applications, or other application that allows for financial modeling, management, and/or transactions, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS ®, Mac® OS X®; Red Hat® Linux®, or a custom operating system.

One or more of client applications 22, 24, 26, 28 may be configured to effectuate some or all of the functionality of rebalance process 10 (and vice versa). Accordingly, rebalance process 10 may be a purely server-side application, a purely client-side application, or a hybrid server-side/client-side application that is cooperatively executed by one or more of client applications 22, 24, 26, 28 and rebalance process 10.

One or more of client applications 22, 24, 26, 28 may be configured to effectuate some or all of the functionality of financial application 20 (and vice versa). Accordingly, financial application 20 may be a purely server-side application, a purely client-side application, or a hybrid server-side/client-side application that is cooperatively executed by one or more of client applications 22, 24, 26, 28 and financial application 20.

Users 46, 48, 50, 52 may access computer 12 and rebalance process 10 directly through network 14 or through secondary network 18. Further, computer 12 may be connected to network 14 through secondary network 18, as illustrated with phantom link line 54. Rebalance process 10 may include one or more user interfaces, such as browsers and textual or graphical user interfaces, through which users 46, 48, 50, 52 may access rebalance process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
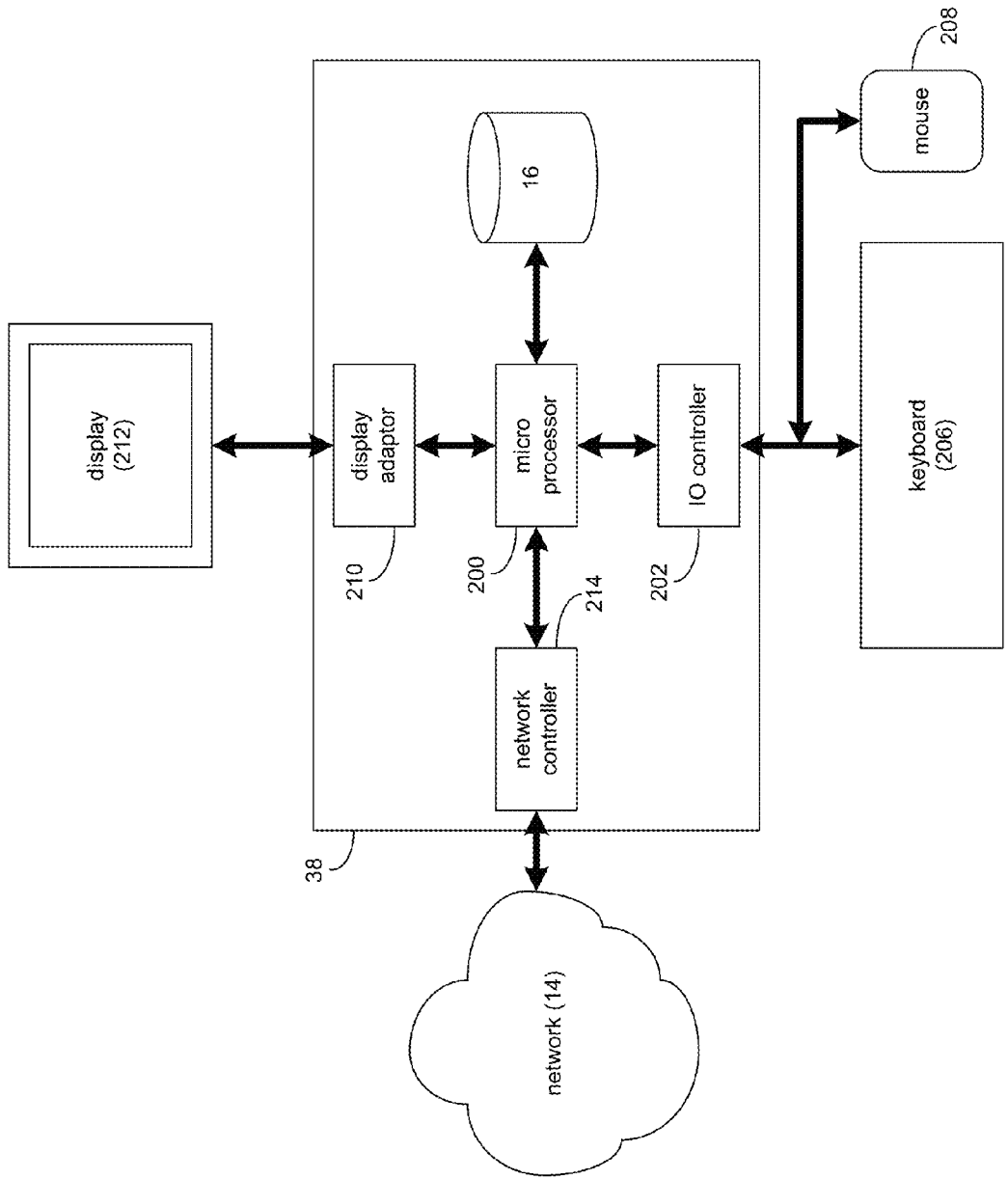
FIG. 2 is a diagrammatic view of a client electronic device of FIG. 1 according to one or more implementations of the present disclosure.
Figure 3A:
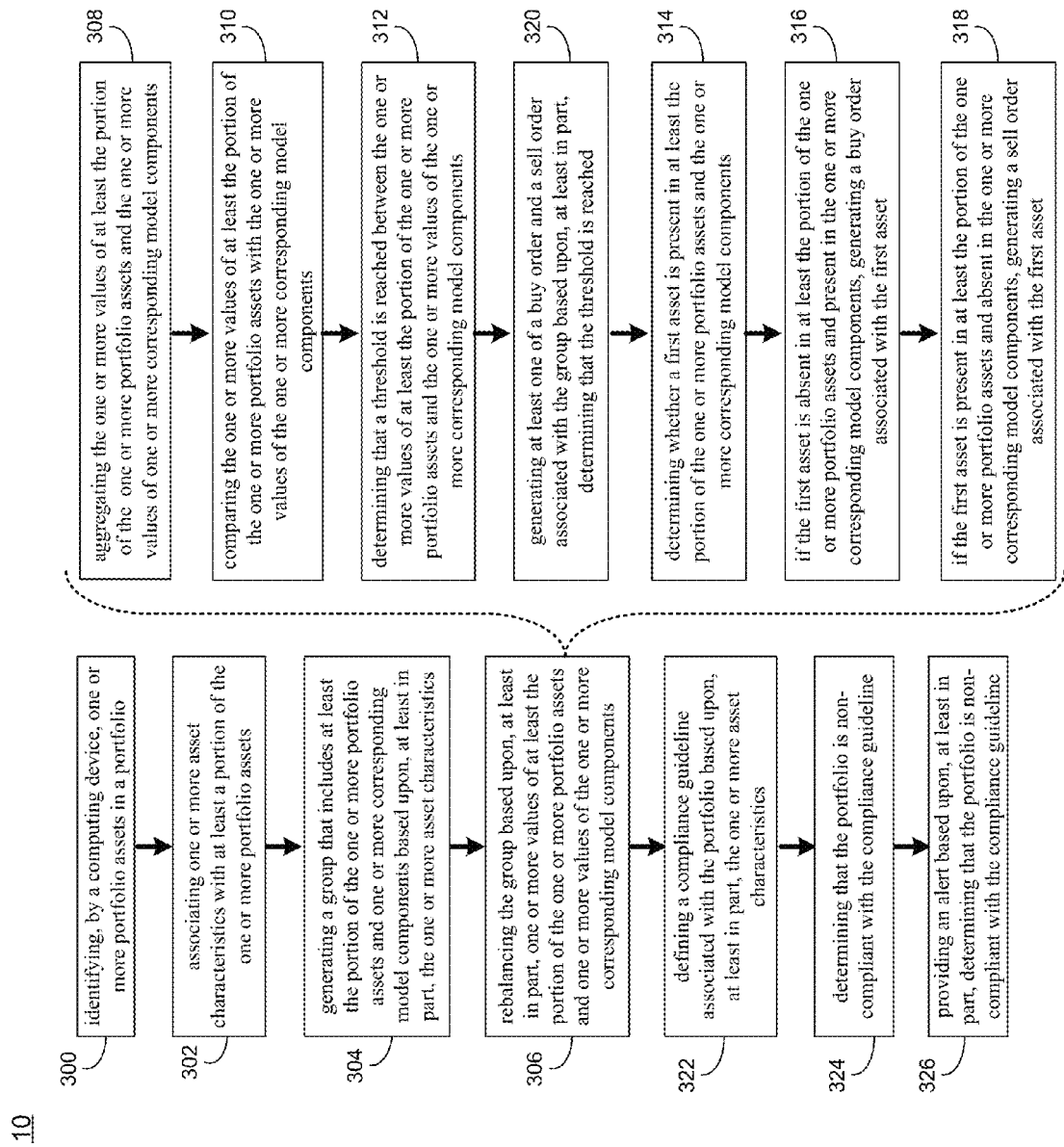
FIGS. 3a-h is an illustrative flowchart of the rebalance process of FIG. 1 according to one or more implementations of the present disclosure.
Figure 3B:
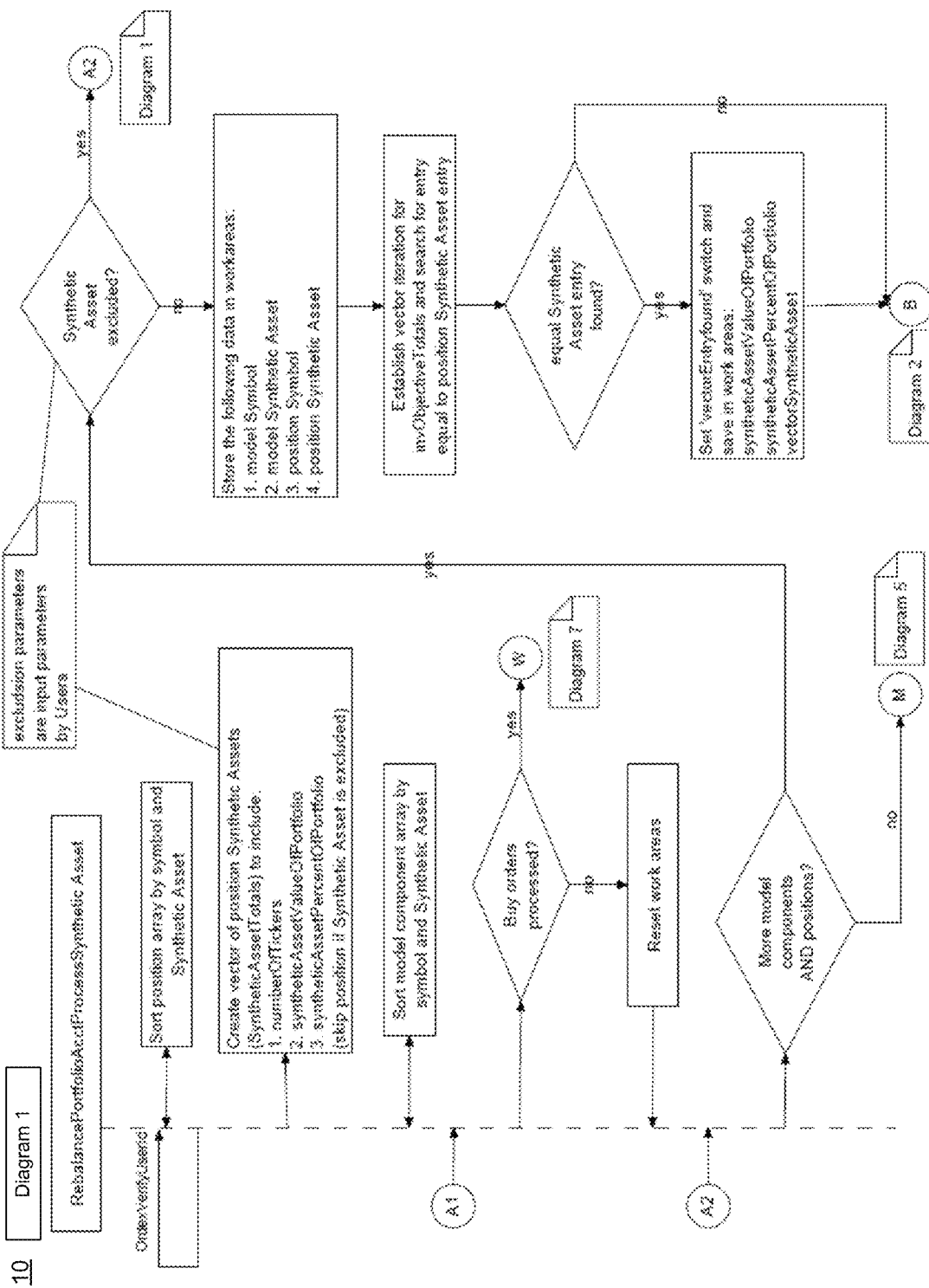
Figure 3C:
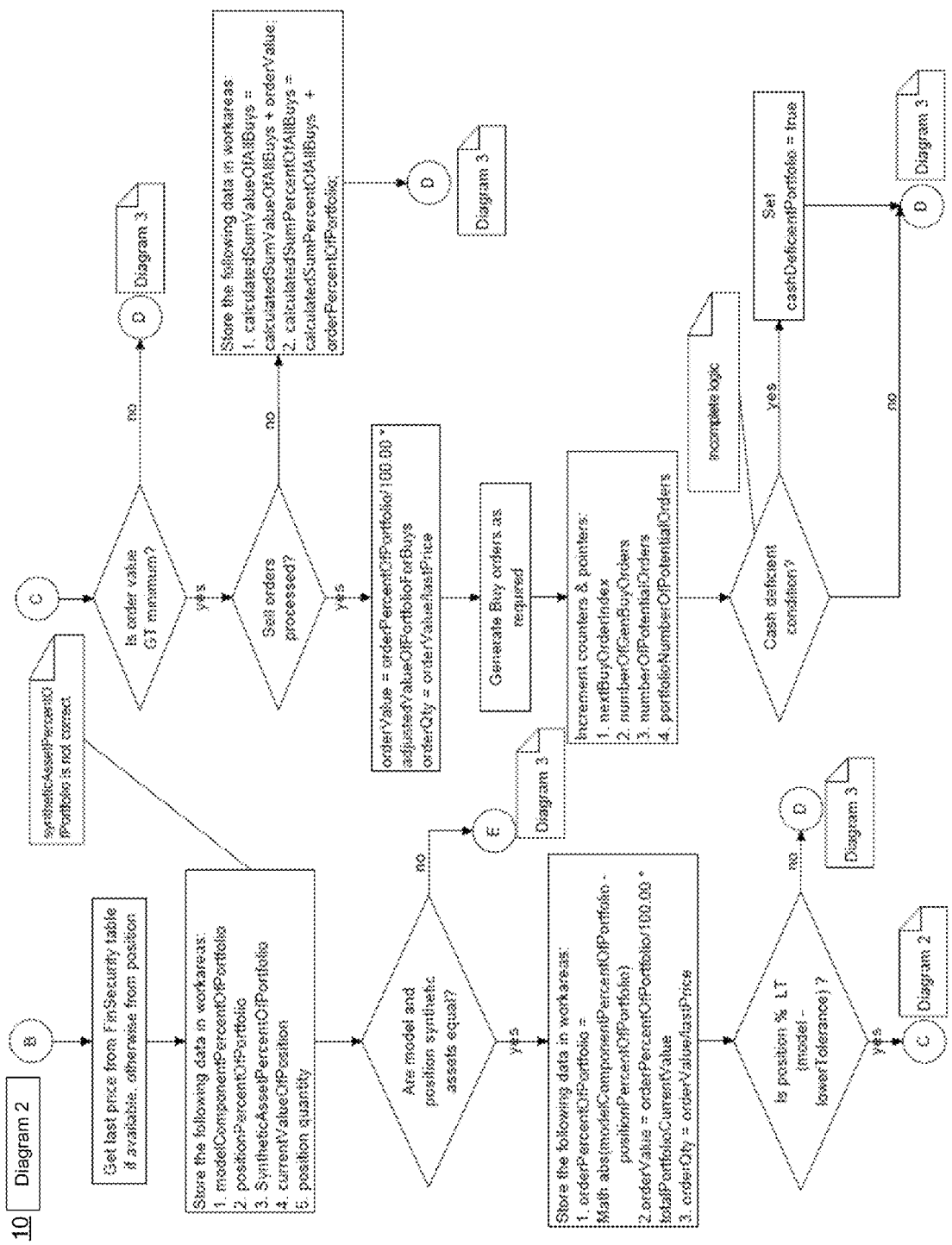
Figure 3D:
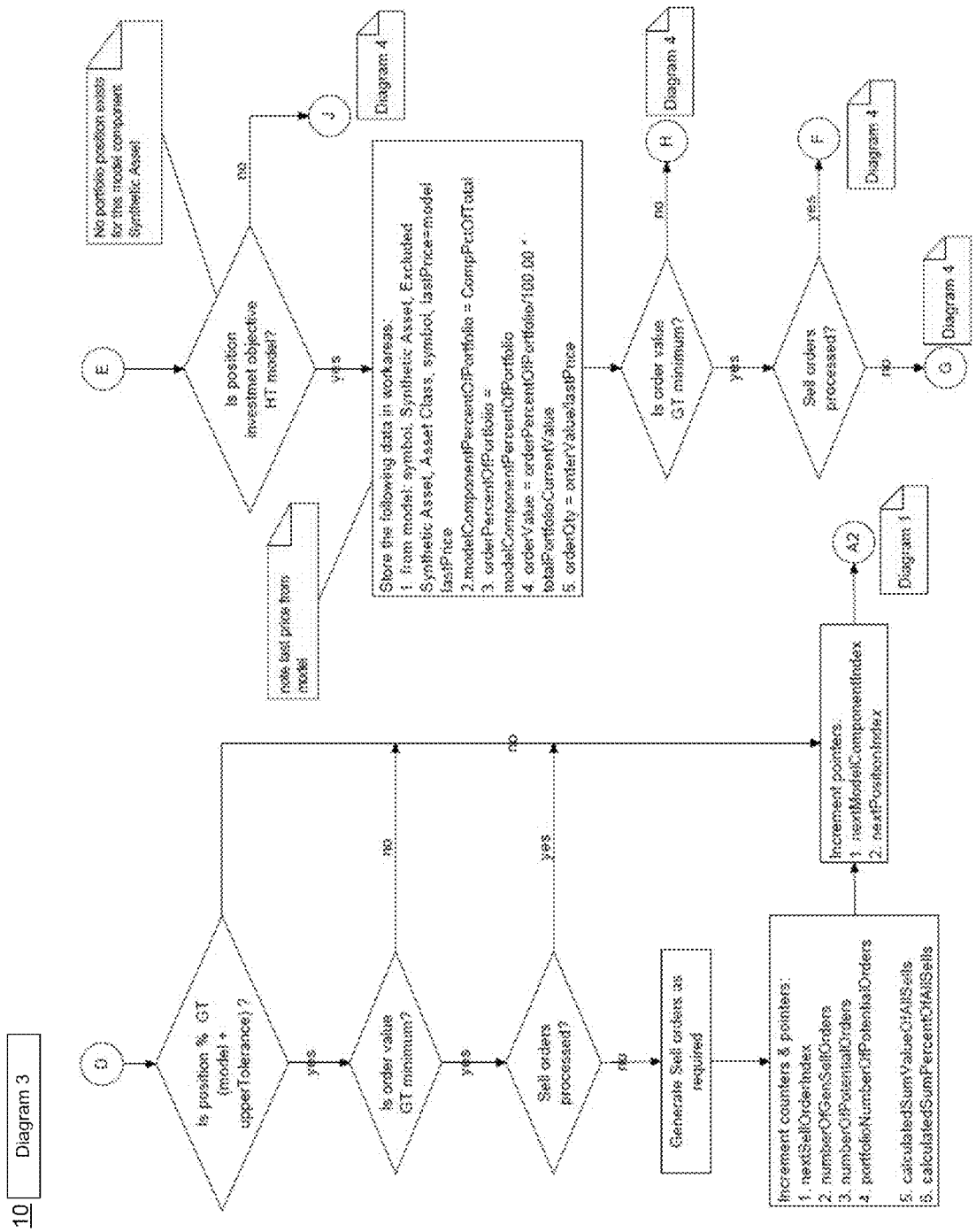
Figure 3E:
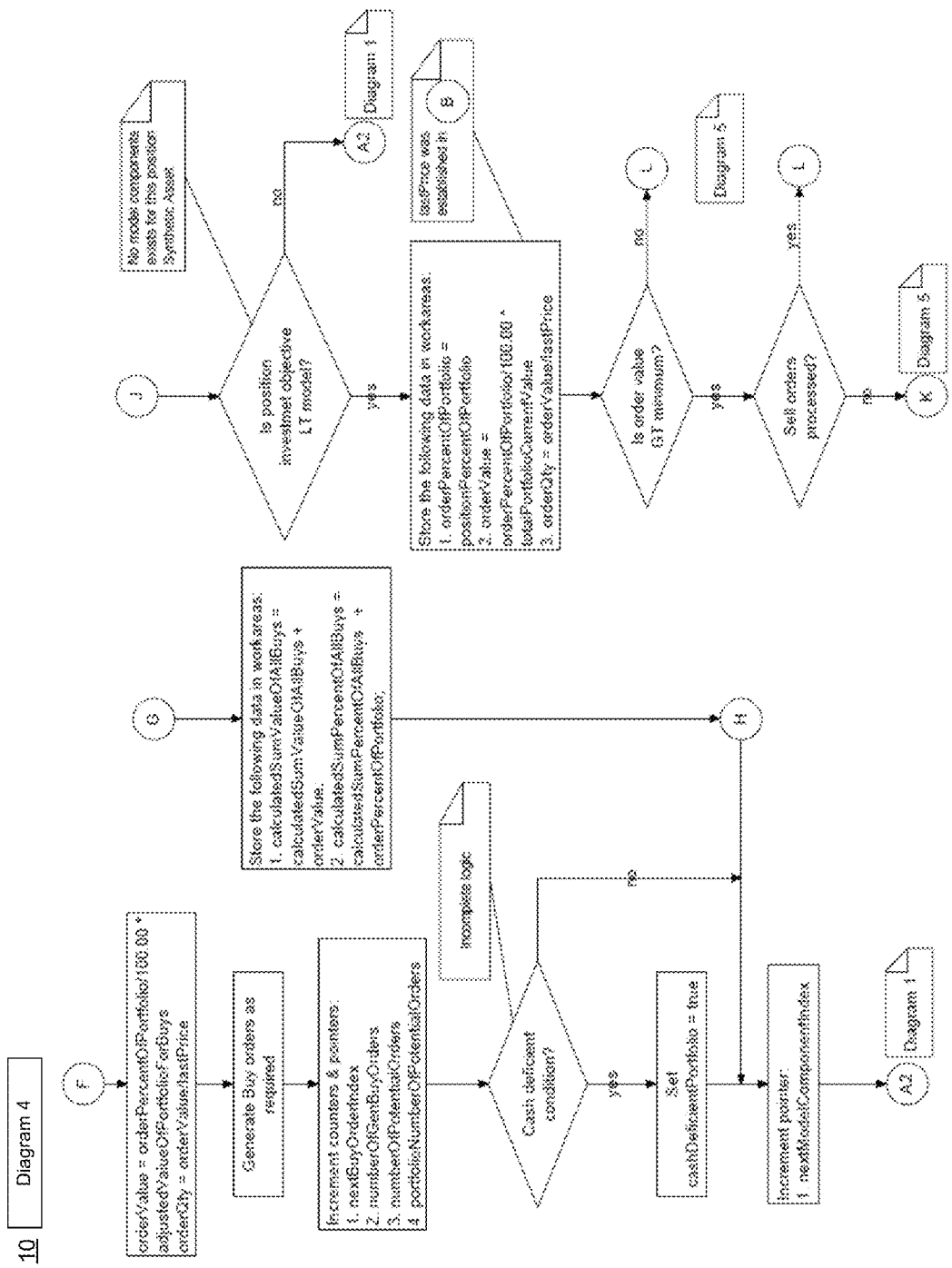
Figure 3F:
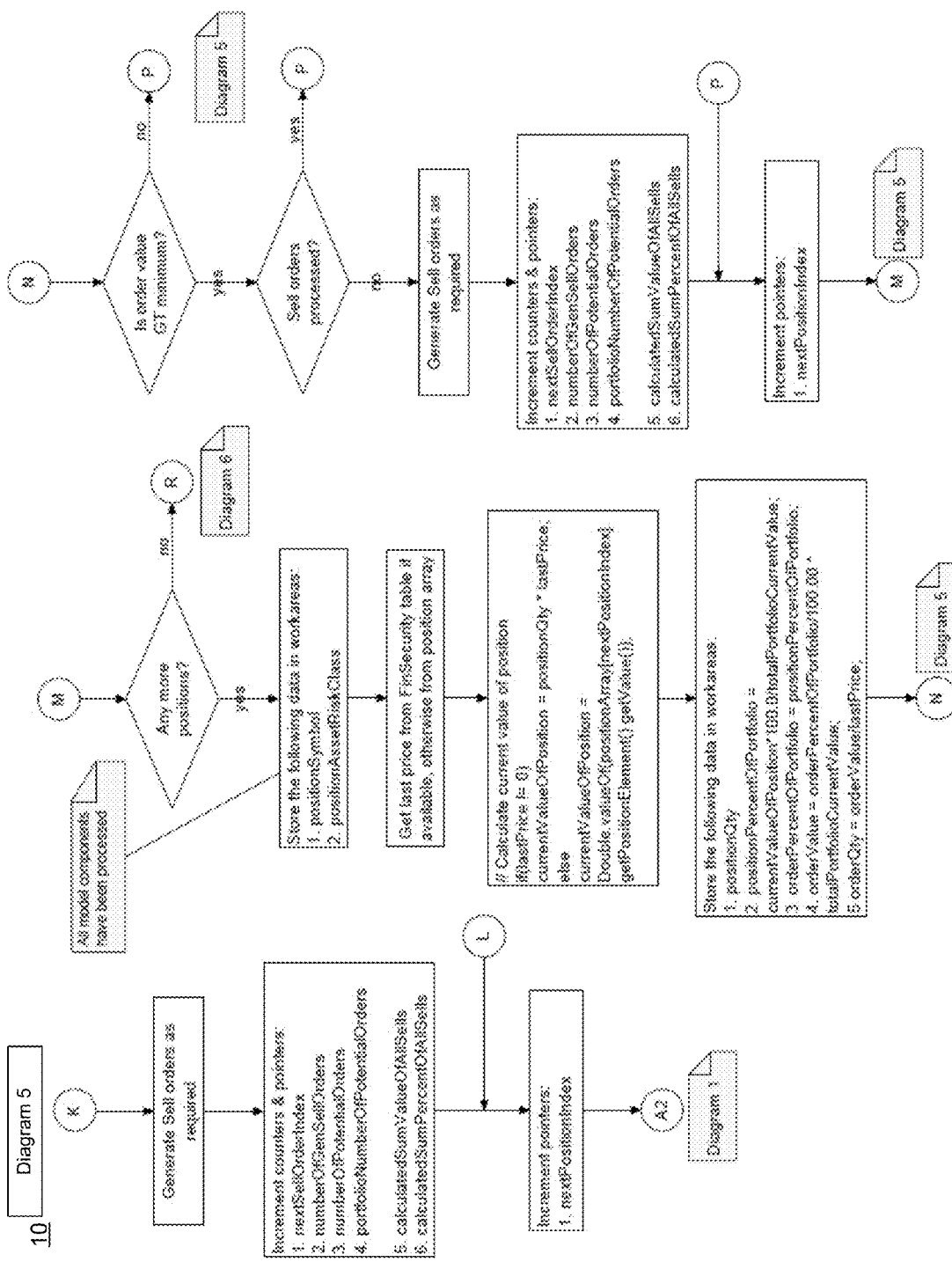
Figure 3G:
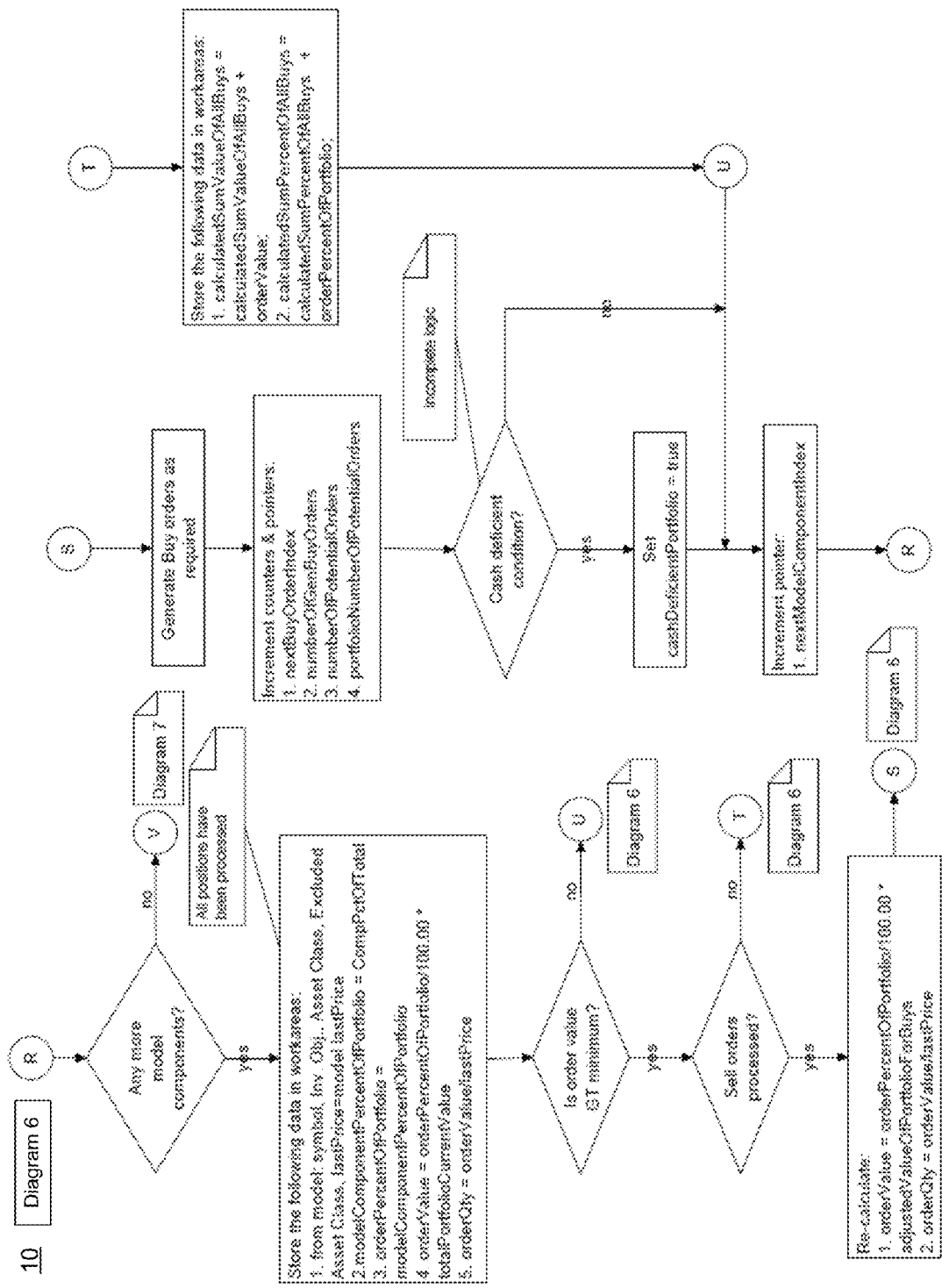
Figure 3H:
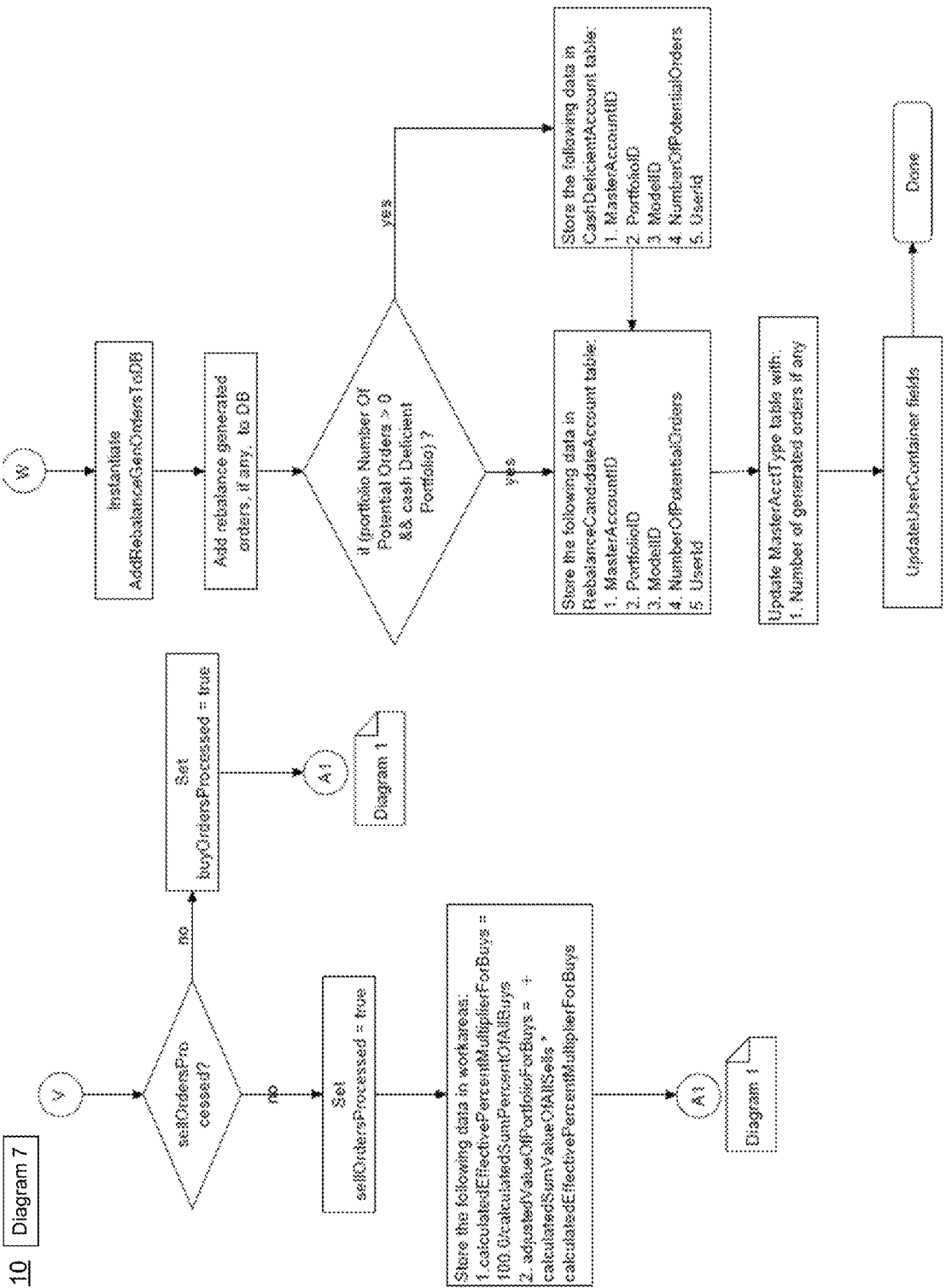

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, rebalance process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), custom device (not shown), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Rebalance Process:

Financial portfolios may be rebalanced, e.g., automatically, to, for example, maximize the portfolio's return on investments within pre-defined risk tolerance levels represented by the portfolio's financial instruments (e.g., assets). In some implementations, assets may include financial instruments such stocks, fixed income instruments, mutual funds, and other financial instruments that may be traded in the financial industry. Household information may provide, e.g., a matrix, of portfolio owners that may be related, such as family members and portfolios owned in addition to individual owners that may have multiple portfolios.

The composition of the financial portfolio may be uniquely defined. For instance, as will be discussed in greater detail below, certain individual financial instruments (e.g., assets) present in a portfolio may be grouped into a synthetic asset. The changes in the value of each synthetic asset as compared to total value of the portfolio subject to predefined threshold tolerance levels may be measured. When these tolerance levels are not met by the value of the particular synthetic asset, e.g., the value of the synthetic asset is below or above the threshold value, orders may be automatically (or manually) generated and placed in, e.g., a database table or other storage format, to compensate for the changes and bring the portfolio in-line with the original pre-defined risk tolerance levels.

In some implementations, rebalancing may be initiated by a number of alternatives selected by a user (e.g., a Financial Advisor or any other person designated with the responsibility of managing a financial portfolio). As will be discussed in greater detail below, example alternatives available to rebalance may include: i) a predefined date/time where rebalancing may occur (manually, automatically, etc.) for one or more groups of portfolios, ii) rebalancing (manually, automatically, etc.) may occur at any time desired for one or more groups of portfolios, iii) rebalancing (manually, automatically, etc.) may occur on a cyclical basis as defined by a user for one or more groups of portfolios.

As discussed above and referring also to FIGS. 3-11, rebalance process 10 (that may include one or more of portions of Diagrams 1-7 in FIGS. 3*a-h*) may identify 300, by a computing device, one or more portfolio assets in a portfolio. One or more asset characteristics may be associated 302 by rebalance process 10 with at least a portion of the one or more portfolio assets. A group that includes at least the portion of the one or more portfolio assets and one or more corresponding model components may be generated 304 by rebalance process 10 based upon, at least in part, the one or more asset characteristics. The group may be rebalanced 306 by rebalance process 10 based upon, at least in part, one or more values of at least the portion of the one or more portfolio assets and one or more values of the one or more corresponding model components.

In some implementations, rebalance process 10 may identify 300, by a computing device, one or more portfolio assets in a portfolio. For example, and referring to a user interface of rebalance process 10 in FIG. 4, a number of financial assets including their relevant characteristics is shown. The column designated as Ticker 2-10 may represent one or more of each instrument's symbol. Other columns may represent, e.g., asset names 2-20, the synthetic asset (discussed in greater detail below) designation 2-30 that in this example represents the Investment Objectives 2-40, and asset Types 2-50.

In some implementations, one or more asset characteristics may be associated 302 by rebalance process 10 with at least a portion of the one or more portfolio assets. In some implementations, at least one of the one or more asset characteristics may include at least one of an asset type, an industry segment, an asset group, an asset risk investment objective, and a customized asset characteristic. For instance, the values of one or more asset characteristics may be shown on the corresponding row and depending on the individual asset, the designated value may be shown. For example, Investment Objective 2-40 may be Large Cap—Value, Balanced—Hybrid, or Cash or Equivalent. Where asset Type 2-50 may be Equity, Fixed Income, or Cash or Equivalent—all common industry designations. Other asset characteristics may include, e.g., Security Type (e.g., mutual fund, stock, exchange traded fund, etc.), Industry Segment (e.g., transportation, banking, utilities, etc.), or any other user defined characteristic (e.g., via rebalance process 10).

In some implementations, an asset characteristic may include a synthetic asset. In some implementations, a synthetic asset may include, e.g., a generic term to which may facilitate assignment of one or more asset characteristics as shown by example in FIG. 4 reference numbers 2-30 and 2-40. As will be discussed in greater detail below, the synthetic asset may be used as one or more rebalancing parameters.

A top portion of an example screen shot in a user interface of rebalance process 10 in FIG. 5, 3-10 may represent a window where any selected asset's characteristics may be displayed upon selection by a user (e.g., via rebalance process 10) from, e.g., list 3-20, allowing the user to make changes to those characteristics as desired via drop-down windows 3-30 and 3-40. The user (e.g., asset manager, portfolio manager, trader, financial advisor, self-managed asset manager, or any person who may perform the rebalancing for him/her or for clients).

Referring to FIG. 6, the contents of an example financial portfolio is shown. A financial portfolio may include, e.g., one or more position. A position may include a financial asset owned by the portfolio owner. In FIG. 6, one or more of each asset in the portfolio may be represented by its characteristics including, e.g., symbol (e.g., ticker) 4-10, price 4-20 that may represent last market closing price for the asset, quantity owned 4-30, percentage value 4-40 of this position relative to the total portfolio value, investment objective 4-50, asset type 4-60, and Fund Family 4-70 for mutual fund assets.

In some implementations, rebalancing process 10 may rebalance 306 a financial portfolio using traditional actual asset symbols as the rebalancing parameter per user's preference. For example, referring now to FIG. 7, there is shown an example user interface of rebalance process 10 with model components based on an asset symbol model. A model component may include, e.g., a benchmark for the desired position value in the portfolio to which the model may be assigned (e.g., +/− one or more tolerance threshold values). In the example, asset symbol 5-10 may be the primary rebalancing parameter. The % of total value 5-20 may include what the % value of corresponding portfolio position relative to total portfolio value should be subject to the above-noted +/− threshold tolerances 5-30 and 5-40. Last price 5-50 may include prior trading day's closing price for the asset. Cum % Weight may show a running total of component percentages and may have to total 100% otherwise, an error alert condition may be presented to the user (e.g., via rebalance process 10). The alert may be presented using any technique, such as a pop-up alert, text message, email message, etc.

In some implementations, a group that includes at least the portion of the one or more portfolio assets and one or more corresponding model components may be generated 304 by rebalance process 10 based upon, at least in part, the one or more asset characteristics. For instance, and referring at least to FIG. 8, an example user interface of rebalance process 10 is shown with one or more example model components based on the above-noted synthetic asset model. In some implementations, a model component may include a benchmark for the desired aggregate positions value for the positions that may have the same asset characteristics represented by the synthetic asset in the portfolio to which the model may be assigned (e.g., +/− the above-noted tolerance threshold values). In the example, the asset symbol 6-10 may be the primary rebalancing parameter and may indicate a synthetic rebalancing is desired and 6-20 may designate the Investment Objective as the rebalancing parameter, as opposed to FIG. 7 reference number 5-10 that designates asset symbol as the rebalancing parameter. The % of total value 6-30 may include what the % value of corresponding aggregate portfolio positions relative to total portfolio value should be, subject to the above-noted +/− threshold tolerances 6-40 and 6-50. Cum % Weight may include a running total of one or more component percentages and may total 100%, otherwise an error alert condition may be presented to the user as noted above. In some implementations, rebalance process 10 may include the ability to rebalance 306 as a synthetic rebalancing (e.g., utilizing the asset symbol models based on user selected options, e.g., asset symbol) or synthetic asset rebalancing for asset symbol model types.

In some implementations, rebalance process 10 may rebalance one specific portfolio, multiple portfolios under the same Master Account (e.g., a Master Account that may represent a group of portfolios that may belong to the same entity or person), multiple Master Accounts grouped together (e.g., Household Accounts), and/or the entire database of all portfolios. Depending on the User's selection, the system and method will drill down from the hierarchy of accounts and will perform the following steps for each portfolio.

In some implementations, the group may be rebalanced 306 by rebalance process 10 based upon, at least in part, one or more values of at least the portion of the one or more portfolio assets and one or more values of the one or more corresponding model components. For example, an array of some or all database stored positions of the portfolio (e.g., positions array or other format), may be created by rebalance process 10 that may include key portfolio values, such as, e.g., asset symbol, asset characteristic corresponding to the synthetic asset, asset class, portfolio position value, asset last closing price, position quantity, and other position values. Rebalance process 10 may create an array (or other format) of database (or otherwise) stored model values (e.g., model array) that may include synthetic asset, desired position % of total portfolio value, threshold upper and lower % values, etc. The position array and model array may be sorted by rebalance process 10 according to synthetic asset.

For example, rebalance process 10 may generate a position vector that may include an entry as an aggregated position for some or all positions that may have the same synthetic asset value and that may represent the aggregated position value (e.g., $ value) and % value of the aggregated position relative to the portfolio value. This vector may include a superset of the above-noted portfolio array. Rebalance process 10 may generate a corresponding model vector similarly with aggregated model components which may have the same synthetic asset value and the vector may represent a superset of the model array.

In some implementations, as will be discussed in greater detail below, rebalance process 10 may invoke an iterative process to determine, e.g.,:
1. What portfolio position(s) or partial position(s) may need to be sold by, e.g.,:
   a. Determining which aggregated positions' values have exceeded the threshold value.
   b. Determining which aggregated positions do not have a corresponding aggregated synthetic asset model component.
2. What portfolio positions or partial positions may need to be bought by, e.g.,:
   a. Determining which aggregated positions' values have fallen below the threshold value.
   b. Determining which aggregated model components do not have a corresponding aggregated synthetic asset position.

An example user interface of rebalance process 10 in FIG. 9 shows example details of a portfolio and the corresponding model values. The values of the portfolio positions 7-10, the Acct % 7-20 that may include the position's % of the total portfolio value, the position Investment Objective 7-30 that may include the selected synthetic asset, are also shown. The corresponding model values are also shown as model % 7-40 that may include the desired % value of the synthetic asset relative to the total portfolio value, model Investment Objective 7-50 that may include the selected synthetic asset.

Figure 10:
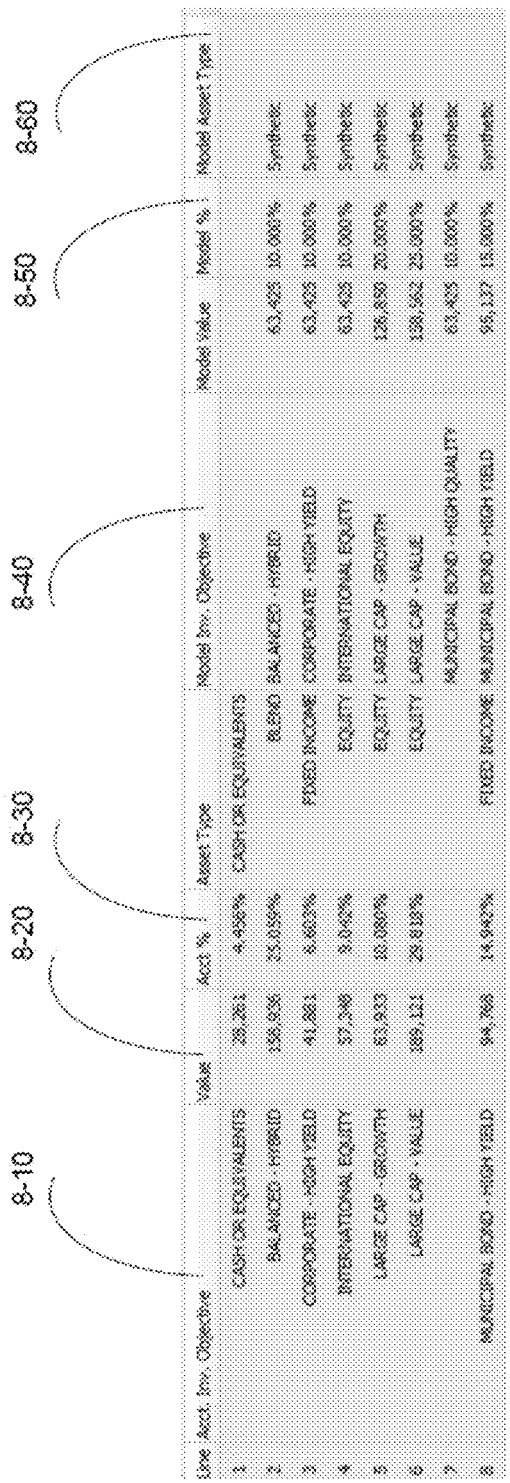
FIG. 10 is an illustrative diagrammatic view of a screen image displayed by the rebalance process of FIG. 1 according to one or more implementations of the present disclosure.

An example user interface of rebalance process 10 is shown in FIG. 10, which shows example details of a portfolio and the corresponding model values, e.g., in the aggregated format. The aggregated values of the portfolio positions 8-20, the Acct % 8-30 that may include the aggregated position's % of the total portfolio value, the position Investment Objective 8-10 that may include the selected synthetic asset, are also shown. The corresponding aggregated model values are also shown as model Investment Objective 8-40, which may include the selected synthetic asset, model % 8-50 that may include the desired % value of the synthetic asset relative to the total portfolio value, and Model Asset Type 8-60 that may indicate that the model has been created as a synthetic model.

In some implementations, rebalancing 306 may include rebalance process 10 aggregating 308 the one or more values of at least the portion of the one or more portfolio assets and the one or more values of one or more corresponding model components, comparing 310 the one or more values of at least the portion of the one or more portfolio assets with the one or more values of the one or more corresponding model components, and determining 312 that a threshold is reached between the one or more values of at least the portion of the one or more portfolio assets and the one or more values of the one or more corresponding model components. For example, to determine what portfolio positions or partial positions may have to be sold, rebalance process 10 (as noted above) may compare 310 one or more of each model vector's aggregated model component to one or more of each corresponding aggregated vector position utilizing the synthetic asset as the parameter.

In some implementations, rebalancing 306 may further include rebalance process 10 generating 320 at least one of a buy order and a sell order associated with the group based upon, at least in part, determining that the threshold is reached. For instance, in the example, if an equal synthetic asset condition is detected and the aggregated value of the position exceeds the aggregated value dictated by the model plus the upper threshold value, a "sell order" may generated 320 and placed in an "orders" database table (or other format).

Continuing with the example, if there exist multiple positions with equal synthetic asset value, the above-noted user interface of rebalance process 10 may enable the user to define the selection criteria such as, e.g., highest value position(s), position(s) with most increase in value, first position(s) detected, or other user defined selection criteria. Continuing with the example, if no corresponding model component is found for the position synthetic asset, a "sell order" may be generated 320 by rebalance process 10 and may be placed in the "orders" database table (or other format).

In some implementations, rebalancing 306 may further include rebalance process 10 determining 314 whether a first asset is present in at least the portion of the one or more portfolio assets and the one or more corresponding model components, and if the first asset is absent in at least the portion of the one or more portfolio assets and present in the one or more corresponding model components, generating 316 by rebalance process 10 a buy order associated with the first asset, and if the first asset is present in at least the portion of the one or more portfolio assets and absent in the one or more corresponding model components, generating 318 by rebalance process 10 a sell order associated with the first asset. For instance, to determine what buy orders may need to be generated 320, rebalance process 10 may compare 310 one or more of each model vector's aggregated model component to one or more of each corresponding aggregated vector position that may be utilizing the synthetic asset as the parameter.

In the example, if an equal condition is detected by rebalance process 10 and the aggregated value of the model exceeds the aggregated value of the position less the lower threshold value, a "buy order" may be generated 320 and placed in the "orders" database table (or other format). If an equal condition is detected by rebalance process 10 and the aggregated value of the position exceeds the aggregated value of the model plus the upper threshold value, a "sell order" may be generated 320 and placed in the "orders" database table (or other format). If no corresponding position is found for the synthetic asset, a "buy order" may be generated 320 and placed in the "orders" database table (or other format).

In some implementations, to determine the value of each buy order, rebalance process 10 may calculate the proportional value of one or more buy orders as follows, e.g.,:

a. During one or more iterations, rebalance process 10 may, e.g., for one or more of each sell order generated, and one or more of each potential buy order:

Calculated Sum Value of one or more Sells=Calculated Sum Value of one or more Sells+Value of Current Sell Order.     i.

Calculated Sum Percent of one or more Sells=Calculated Sum Percent of one or more Sells+Percent Value of Current Sell Order.     ii.

Calculated Sum Value of one or more Buys=Calculated Sum Value of one or more Buys+Value of Current Potential Buy Order.     iii.

Calculated Sum Percent of one or more Buys=Calculated Sum Percent of one or more Buys+Percent Value of Current Potential Buy Order.     iv.

b. Once one or more of the sell orders have been generated, rebalance process 10 may further, e.g.,:

Calculated Effective Percent Multiplier For Buys=100.0/Calculated Sum Percent Of one or more Buys.     i.

Adjusted Value of portfolio for Buys=Calculated Sum Value of one or more Sells*Calculated Effective Percent Multiplier For Buys.     ii.

c. At this point for one or more of the above-noted iterations (e.g., the last iteration), as noted above, rebalance process 10 may again compare 310 one or more of each model vector's aggregated model component to one or more of each aggregated vector position utilizing the synthetic asset as the parameter to determine what buy orders may be generated 320. The value of one or more of each buy order to be generated may be calculated and other appropriate values may be updated by, e.g.,:

Order Percent Of Portfolio=Model Component Percent Of Portfolio less sum percent of existing (or aggregated) portfolio position.     i.

Value of Current Buy Order=Order Percent Of Portfolio/100.00*Adjusted Value Of Portfolio For Buys.     ii.

In some implementations, a compliance guideline associated with the portfolio may be defined 322 by rebalance process 10 based upon, at least in part, the one or more asset characteristics. For instance, an example user interface of rebalance process 10 is shown in FIG. 11, and shows example asset allocation policies 9-10. The asset allocation policy may be used to ensure that the portfolio meets a contractual agreement and expectation of the client (e.g., the owner of the portfolio). The asset allocation policy may define the risk tolerances of the clients as specified by the asset types 9-20. For example, in FIG. 11, the compliance requirements may dictate that between 35% (9-30) and 55% (9-40) of the portfolio should be allocated to blend asset type. Similarly, between 0% and 15% should be kept in cash or equivalents.

Similar as discussed above, rebalancing process 10 may use an iterative process to:

1. Compare 310 each portfolio position (or aggregated) to the corresponding asset (or aggregated) allocation policy component in FIG. 11, reference number 9-50.
2. Determine what portfolio positions or partial positions may need to be sold by, e.g.,:
   a. Determining which aggregated positions' values have exceeded the threshold value specified by the asset (or aggregated) allocation policy component asset type 9-20.
   b. Determining which aggregated positions do not have a corresponding asset (or aggregated) allocation policy asset type 9-20.
3. Determine what portfolio positions or partial positions may need to be bought by, e.g.,:
   a. Determining which aggregated positions' values may have fallen below the low threshold value specified by the asset allocation policy component for the particular asset type 9-20.
   b. Determining which aggregated asset allocation policy components do not have a corresponding aggregated portfolio position.

Rebalance process 10 may determine 324 that the portfolio is non-compliant with the compliance guideline, and an alert may be provided 326 by rebalance process 10 based upon, at least in part, determining 324 that the portfolio is non-compliant with the compliance guideline. As noted above, the alert may be presented using any technique, such as a pop-up alert, text message, email message, etc.

While one or more of the above implementations may be described using financial portfolios, the disclosure may be used for various other applications without departing from the scope of the disclosure. For example, the disclosure may be used to, e.g., organize, modify, and/or render accounting information, etc. Thus, the example of financial portfolios should be taken as an example only and not to otherwise limit the scope of the disclosure. The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   identifying, by a computing device, one or more portfolio assets in a portfolio;
   associating, by the computing device, one or more asset characteristics with at least a portion of the one or more portfolio assets;
   generating, by the computing device, a group that includes at least the portion of the one or more portfolio assets and one or more corresponding model components based upon, at least in part, the one or more asset characteristics, wherein each portfolio asset in the group has the one or more asset characteristics and wherein the group is generated as a portfolio synthetic asset of the one or more portfolio assets in the portfolio; and
   rebalancing, by the computing device, the group based upon, at least in part, comparing one or more values of at least the portion of the one or more portfolio assets in the group and one or more values of the one or more corresponding model components.

2. The computer-implemented method of claim 1 wherein at least one of the one or more asset characteristics includes at least one of an asset type, an industry segment, an asset group, an asset risk investment objective, and a customized asset characteristic.

3. The computer-implemented method of claim 1 wherein rebalancing includes:
   aggregating the one or more values of at least the portion of the one or more portfolio assets and the one or more values of one or more corresponding model components;
   comparing the one or more values of at least the portion of the one or more portfolio assets with the one or more values of the one or more corresponding model components; and
   determining that a threshold is reached between the one or more values of at least the portion of the one or more portfolio assets and the one or more values of the one or more corresponding model components.

4. The computer-implemented method of claim 3 wherein rebalancing further includes generating at least one of a buy order and a sell order associated with the group based upon, at least in part, determining that the threshold is reached.

5. The computer-implemented method of claim 3 wherein rebalancing further includes:
   determining whether a first asset is present in at least the portion of the one or more portfolio assets and the one or more corresponding model components; and
   if the first asset is absent in at least the portion of the one or more portfolio assets and present in the one or more corresponding model components, generating a buy order associated with the first asset, and if the first asset is present in at least the portion of the one or more portfolio assets and absent in the one or more corresponding model components, generating a sell order associated with the first asset.

6. The computer-implemented method of claim 1 further comprising defining a compliance guideline associated with the portfolio based upon, at least in part, the one or more asset characteristics.

7. The computer-implemented method of claim 6 further comprising:
   determining that the portfolio is non-compliant with the compliance guideline; and
   providing an alert based upon, at least in part, determining that the portfolio is non-compliant with the compliance guideline.

8. A computing system including a processor and a memory configured to perform operations comprising:
   identifying, by a computing device, one or more portfolio assets in a portfolio;
   associating one or more asset characteristics with at least a portion of the one or more portfolio assets;
   generating a group that includes at least the portion of the one or more portfolio assets and one or more corresponding model components based upon, at least in part, the one or more asset characteristics, wherein each portfolio asset in the group has the one or more asset characteristics and wherein the group is generated as a portfolio synthetic asset of the one or more portfolio assets in the portfolio; and
   rebalancing, by the computing device, the group based upon, at least in part, comparing one or more values of at least the portion of the one or more portfolio assets in the group and one or more values of the one or more corresponding model components.

9. The computing system of claim 8 wherein at least one of the one or more asset characteristics includes at least one of an asset type, an industry segment, an asset group, an asset risk investment objective, and a customized asset characteristic.

10. The computing system of claim 8 wherein rebalancing includes:

aggregating the one or more values of at least the portion of the one or more portfolio assets and the one or more values of one or more corresponding model components;

comparing the one or more values of at least the portion of the one or more portfolio assets with the one or more values of the one or more corresponding model components; and determining that a threshold is reached between the one or more values of at least the portion of the one or more portfolio assets and the one or more values of the one or more corresponding model components.

11. The computing system of claim 10 wherein rebalancing further includes generating at least one of a buy order and a sell order associated with the group based upon, at least in part, determining that the threshold is reached.

12. The computing system of claim 10 wherein rebalancing further includes:

determining whether a first asset is present in at least the portion of the one or more portfolio assets and the one or more corresponding model components; and if the first asset is absent in at least the portion of the one or more portfolio assets and present in the one or more corresponding model components, generating a buy order associated with the first asset, and if the first asset is present in at least the portion of the one or more portfolio assets and absent in the one or more corresponding model components, generating a sell order associated with the first asset.

13. The computing system of claim 8 further comprising defining a compliance guideline associated with the portfolio based upon, at least in part, the one or more asset characteristics.

14. The computing system of claim 13 further comprising:

determining that the portfolio is non-compliant with the compliance guideline; and providing an alert based upon, at least in part, determining that the portfolio is non-compliant with the compliance guideline.

15. A computer program product residing on a computer readable storage medium having a plurality of instructions stored thereon which, when executed by a processor, cause the processor to perform operations comprising:

identifying, by a computing device, one or more portfolio assets in a portfolio;

associating one or more asset characteristics with at least a portion of the one or more portfolio assets;

generating a group that includes at least the portion of the one or more portfolio assets and one or more corresponding model components based upon, at least in part, the one or more asset characteristics, wherein each portfolio asset in the group has the one or more asset characteristics and wherein the group is generated as a portfolio synthetic asset of the one or more portfolio assets in the portfolio; and rebalancing, by the computing device, the group based upon, at least in part, comparing one or more values of at least the portion of the one or more portfolio assets in the group and one or more values of the one or more corresponding model components.

16. The computer program product of claim 15 wherein at least one of the one or more asset characteristics includes at least one of an asset type, an industry segment, an asset group, an asset risk investment objective, and a customized asset characteristic.

17. The computer program product of claim 15 wherein rebalancing includes:

aggregating the one or more values of at least the portion of the one or more portfolio assets and the one or more values of one or more corresponding model components;

comparing the one or more values of at least the portion of the one or more portfolio assets with the one or more values of the one or more corresponding model components; and determining that a threshold is reached between the one or more values of at least the portion of the one or more portfolio assets and the one or more values of the one or more corresponding model components.

18. The computer program product of claim 17 wherein rebalancing further includes generating at least one of a buy order and a sell order associated with the group based upon, at least in part, determining that the threshold is reached.

19. The computer program product of claim 17 wherein rebalancing further includes:

determining whether a first asset is present in at least the portion of the one or more portfolio assets and the one or more corresponding model components; and if the first asset is absent in at least the portion of the one or more portfolio assets and present in the one or more corresponding model components, generating a buy order associated with the first asset, and if the first asset is present in at least the portion of the one or more portfolio assets and absent in the one or more corresponding model components, generating a sell order associated with the first asset.

20. The computer program product of claim 15 further comprising defining a compliance guideline associated with the portfolio based upon, at least in part, the one or more asset characteristics.

21. The computer program product of claim 20 further comprising:

determining that the portfolio is non-compliant with the compliance guideline; and providing an alert based upon, at least in part, determining that the portfolio is non-compliant with the compliance guideline.

\* \* \* \* \*